United States Patent [19]

Bottomley et al.

[11] Patent Number: 5,024,368
[45] Date of Patent: Jun. 18, 1991

[54] STOPPING-OFF METHOD FOR USE WITH DIFFUSION BONDING

[75] Inventors: Ian E. Bottomley; Graham A. Cooper, both of Preston, United Kingdom

[73] Assignee: British Aerospace, London, England

[21] Appl. No.: 553,321

[22] Filed: Jul. 17, 1990

[30] Foreign Application Priority Data

Aug. 1, 1989 [GB] United Kingdom ............... 8917613

[51] Int. Cl.⁵ ............................................. B23K 20/24
[52] U.S. Cl. .................................. 228/118; 228/193; 228/214; 228/181
[58] Field of Search ............... 228/118, 181, 193, 203, 228/214, 265

[56] References Cited

U.S. PATENT DOCUMENTS

| | | | |
|---|---|---|---|
| 3,638,298 | 2/1972 | Sinizer et al. | 29/470.9 |
| 3,834,000 | 9/1974 | Miller | 29/411 |
| 3,906,617 | 9/1975 | Behringer et al. | 228/118 |
| 3,927,817 | 12/1975 | Hamilton et al. | 228/157 |
| 4,040,159 | 8/1977 | Darrow et al. | 228/118 |
| 4,040,845 | 8/1977 | Richerson et al. | 106/38.9 |
| 4,220,276 | 9/1980 | Weisert et al. | 228/118 |
| 4,530,197 | 7/1985 | Rainville | 52/797 |
| 4,820,355 | 4/1989 | Bampton | 228/118 |

FOREIGN PATENT DOCUMENTS

| | | | |
|---|---|---|---|
| 0266073 | 5/1988 | European Pat. Off. | 20/18 |
| 0350220 | 1/1990 | European Pat. Off. | 20/22 |
| 48671 | 2/1989 | Japan | 228/181 |
| 1433632 | 4/1976 | United Kingdom | 9/2 |

Primary Examiner—Sam Heinrich
Attorney, Agent, or Firm—Kerkam, Stowell, Kondracki & Clarke

[57] ABSTRACT

A method is described of diffusion bonding and superplastic forming components made of aluminium or an aluminium alloy to form a composite formed article. The method involves applying stopping-off material to selected areas of the components to prevent diffusion bonding in those areas, the stopping-off material being applied by plasma spraying.

19 Claims, 5 Drawing Sheets

STOPPING-OFF METHOD FOR USE WITH DIFFUSION BONDING

TECHNICAL FIELD

The present invention relates to diffusion bonding of metal components to form composite structures, which are preferably made of aluminum or an aluminum alloy, e.g. aluminum containing small amounts of other metals, e.g. lithium, magnesium, copper, zirconium and zinc.

BACKGROUND ART

Diffusion bonding is an extremely valuable technique whereby two components are pressed together and heated so that the atoms in each component diffuse into the other component causing metal-to-metal bonding between the components. It is often required that the components are not bonded in all the contacting areas of the components and to prevent bonding it is known to apply a so-called 'stopping-off' material to those areas of the components in which diffusion bonding is not desired.

Diffusion bonding can be combined with superplastic forming (SPF) which is a technique in which heated metal is subject to slow deformation during which the metal stretches and is thinned out in the deformed areas but does not neck or fracture. For example, combined superplastic forming/diffusion bonding processes are used for example to fabricate complex integrally stiffened panels by applying stopping-off material to defined areas of a stack of sheets, subjecting the stack to diffusion bonding so that the sheets bond together in those areas where stopping-off material has not been applied, clamping the stack into a mould, injecting an inert gas into the stack to form the stack superplastically into the shape of the mould, thereby forming the finished panel with the internal sheets of the stack forming the internal stiffening struts of the panel (see U.S. Pat. Nos. 3,834,000; 3,927,817 and 4,530,197).

Generally, stopping-off compositions comprise a ceramic material in a suitable vehicle, e.g. a volatile liquid, so that the stop-off composition can be applied to the components e.g. by screen-printing.

Various stopping-off compositions have been described in the prior art as follows:

EP-A-0 266 073 describes a composition consisting of yttria suspended in a solution of a thermoplastic acrylic polymer together with an anti-settling or anti-coagulant additive. Such a composition can be applied by screen-printing.

U.S. Pat. No. 3,638,298 describes a composition in the form of an aqueous slurry of calcium oxide which can be applied by brushing or dipping; the calcium oxide can be replaced by yttria (when a calcium silicate binder may also be incorporated into the slurry) or other rare earth oxide or cerium sulphide.

U.S. Pat. No. 3,834,000 describes the use of flake graphite, molybdenum disulphide, silica chromic oxide and alumina in pre-hydrolysed ethyl silicate as a stopping-off composition which can be applied by brushing, rolling, or spraying or by means of a doctor blade to areas not covered by a mask.

U.S. Pat. No. 3,906,617 describes a stopping-off composition for preventing brazing and diffusion bonding; the composition contains alumina, titania, magnesia or rare earth compounds in a fugitive carrier which can be applied by brushing.

U.S. Pat. No. 3,927,817 describes a stopping-off composition to prevent diffusion bonding which contains graphite, boron nitride or yttria in a binder; such a composition is applied by spraying.

U.S. Pat. No. 4,220,276 states that an improved stopping-off composition for combined superplastic forming and diffusion bonding techniques is provided by yttria having a particle size of greater than 5 microns and an inert organic liquid vehicle which includes a volatile binder that evaporates at diffusion bonding temperature leaving no residue.

U.S. Pat. No. 4,530,197 describes a stopping-off composition in the form of graphite, boron nitride or yttria in a suitable binder which can be applied to selected areas by screen printing.

Because of the low density, high strength and relative cheapness of aluminum, it is ideal for use in fabricating aeroplane parts but unfortunately its tenacious oxide has prevented its wide-spread use in diffusion bonding processes since the oxide blocks metal diffusion and so diffusion bonding cannot take place. It has been proposed in EP-0 350 220 to remove the oxide layer prior to diffusion bonding and such a process is feasible so long as the diffusion bonding is performed within about 20 minutes of the oxide removal. However, the volatile carrier liquid used in the above-described known stopping-off compositions, which are generally used in diffusion bonding of titanium and its alloys (e.g. Ti Al6 V4), contaminate the unstopped-off areas and prevent diffusion bonding even in areas where the oxide has been removed.

DISCLOSURE OF INVENTION

The present invention is designed to overcome the above problem and provides a method of stopping-off aluminum and aluminum alloys without contaminating the unstopped-off areas. The method can also be applied to stopping-off of other materials, e.g. titanium.

In accordance with the present invention, the stopping-off material is applied by flame or plasma spraying.

The stopping-off material deposited by the method of the present invention should preferably be porous to allow passage therethrough of the gas used in the subsequent superplastic forming step. The preferred stopping-off material is a ceramic, e.g. yttria, alumina, magnesia, boron nitride, rare earth oxides and indeed any other inert ceramic material, but any fusible inert material could be used that does not give off gas (outgas) at diffusion bonding temperatures.

Plasma spraying (sometimes called "flame spraying") is a widely used technique for applying powder materials, e.g. metal powder, to a surface and is performed by feeding the powder (in this case ceramic or other fusible powder) into the high temperature flame obtained by burning a gaseous fuel, e.g. an oxyacetylene flame. The ceramic material is propelled at high speed by the flow of gas in the flame towards a target substrate (in this case, the aluminum component) where it is deposited. The ceramic powder is heated rapidly by the flame to a temperature at which it can fuse so that when the powder particles impinge on the aluminum component, they form a fused surface layer which adheres to the component and so avoids the need for binders that were used by the prior art for this purpose. Therefore, a stopping-off material can be applied to selected areas of the aluminum component without contamination of the adjacent areas.

It is important that the fuel and the oxygen supply to the flame are both free of material that would contaminate the non-stopped-off areas of the component and especially they must be free of oil.

The most convenient way of confining the plasma spray only to those selected areas that it is desired to stop-off is to lay a mask or template over the component to protect the other areas; the mask can also protect the component from heat generated by the spray gun. Further precautions that can be taken to prevent over-heating of the component can include directing a jet of cold inert gas, e.g. argon, over the component and adjusting the temperature of the flame to the minimum required to achieve satisfactory plasma coating of the ceramic material.

The stopping-off layer is preferably applied immediately after the surface oxide layer has been removed from the aluminum component to prevent the oxide layer from re-forming, which occurs in about 20 minutes after oxide removal. It is feasible to apply the stopping-off layer before the removal of aluminum oxide if the oxide removal does not degrade the stopping-off layer but since the removal of aluminum oxide frequently involves some form of abrasion process, this is usually not the case.

Although the present invention has been largely described in connection with aluminum, there is no reason why it should not be applied to components made of other materials, e.g. titanium.

The ceramic stopping-off material deposited by the plasma spray technique is generally porous and inert and we have found that it is effective in stopping-off precisely defined areas without contamination of the surrounding areas so long as the substances used in the plasma spraying are uncontaminated, e.g. pure ceramic and pure gaseous fuel and either pure oxygen or oxygen that is mixed only with an inert gas; if it is free of suspended particles and droplets, air can be used as the oxygen source.

BRIEF DESCRIPTION OF THE DRAWINGS

in FIG. 4a the upper part of the apparatus has been omitted for clarity;

FIG. 6b shows a side view of the top of the apparatus shown in FIG. 6a;

FIG. 6c shows a top view of the superplastic forming apparatus shown in FIG. 6a;

BEST MODE OF CARRYING OUT THE INVENTION

Figure 1:
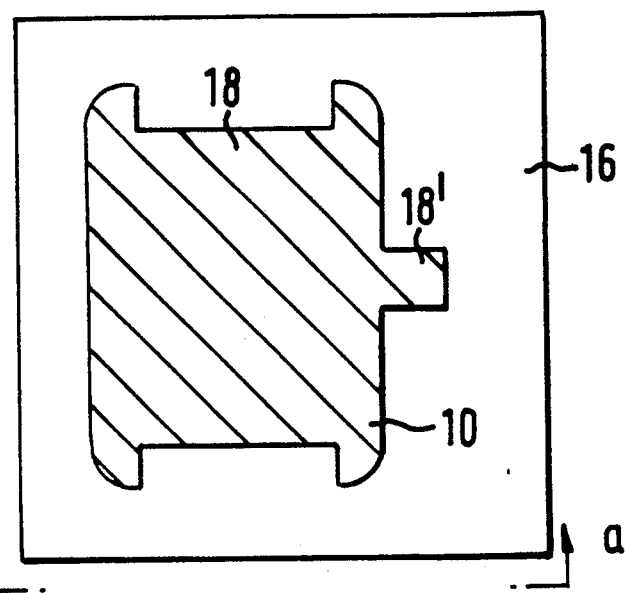
FIGS. 1 and 1a are plan and side views respectively of a first sheet and a mask for use in applying stopping-off material to selected areas of the first sheet.
Figure 1A:
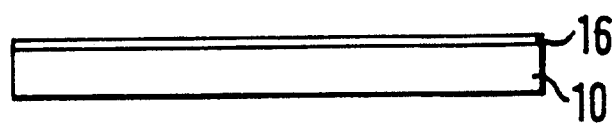
Figure 2:
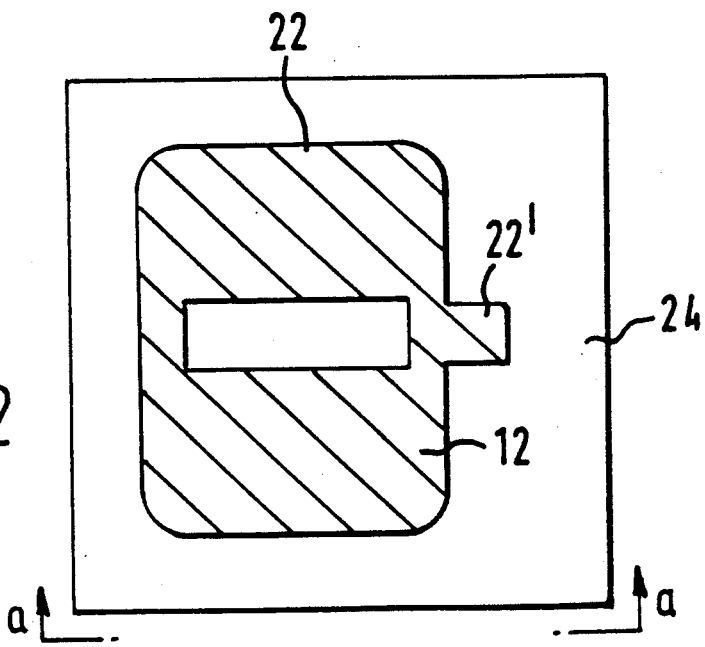
FIGS. 2 and 2a are plan and side views respectively of a second sheet and a mask for use in applying stopping-off material to a selected area of the second sheet.
Figure 2A:
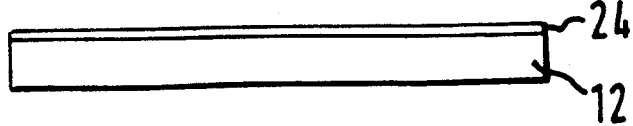
Figure 3:
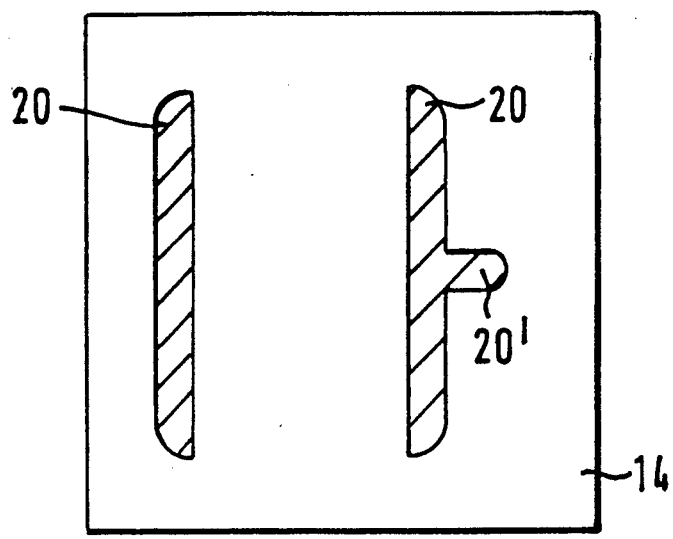
FIG. 3 is a plan view of a third sheet.

First, second and third sheets (10, 12, 14) shown in FIGS. 1 to 3 are made of aluminum alloy 8090 (aluminum containing minor amounts of lithium); these sheets are treated to remove surface oxide, e.g using the method described in EP-0 350 220. Referring to FIGS. 1 and 1a, immediately after oxide removal a mask 16 is placed onto the first sheet 10 to cover areas that are to be bonded to the second sheets (see below) which leaves exposed an area 18 that is not to be so bonded; area 18 has a tail portion 18' the function of which will be explained in greater detail below. An oxyacetylene flame is directed onto area 18 and powdered ceramic material, e.g. yttria, is fed into the flame causing the powder particles to be heated rapidly and to be propelled towards the area 18 at high speed. As a consequence, the powder particles adhere onto area 18 to provide a porous well-defined yttria deposit; areas of the first sheet 10 covered by the mask do not have the yttria deposit.

The materials used to produce the oxyacetylene flame are of very high purity and in particular are free of oil. The mask 16 is made of a heat-resistant thermally insulating material that can withstand the temperatures of the oxyacetylene flame and protects the sheet 10 from the heat of the flame. Further protection is obtained by directing a stream of cold argon against sheet 10.

Using similar techniques, a layer of porous yttria is deposited on area 22 of the second sheet 12 left unexposed by a second mask 24; area 22 also has a tail portion 22'.

The third sheet 14 has two areas 20 cut out as shown in FIG. 3, one including a tail portion 20'.

Figure 4A:
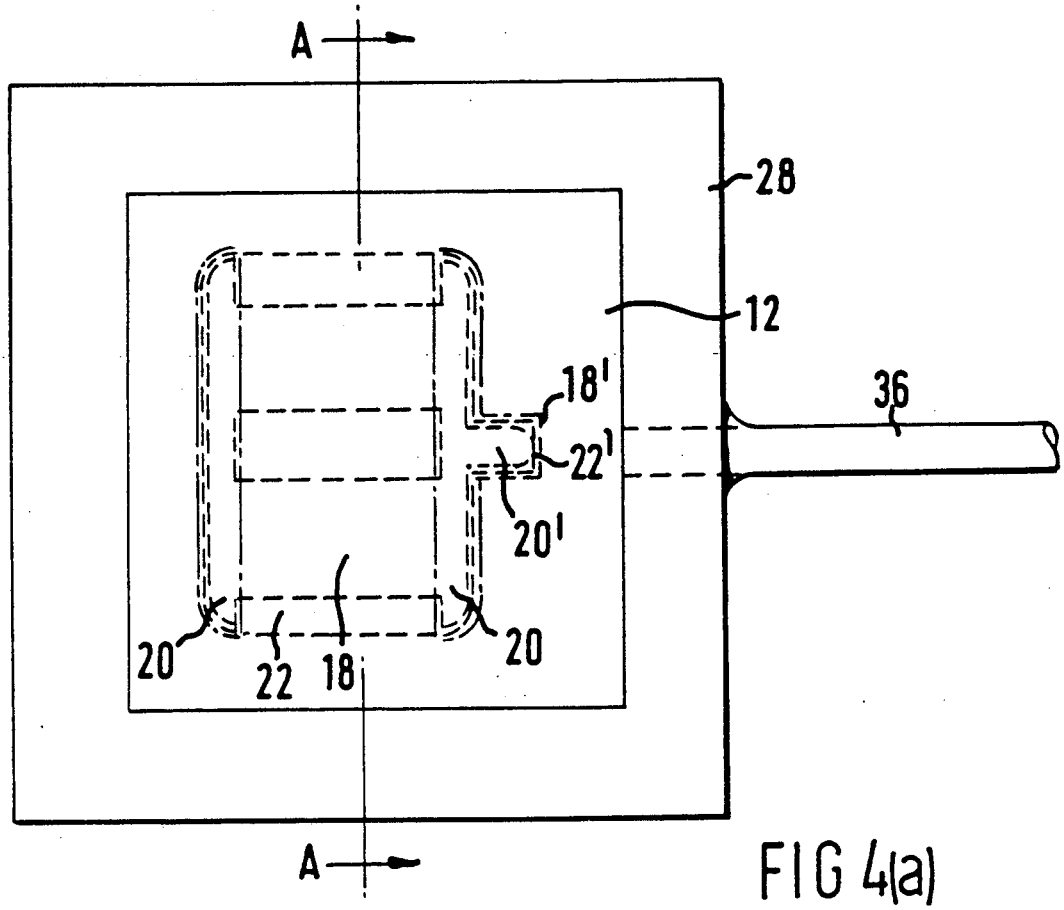
FIGS. 4a and 4b are respectively a plan view and a sectional view (taken on line A—A of FIG. 4a) of a diffusion bonding apparatus and containing a stack composed of the first, second and third sheets (shown in FIGS. 1 to 3) prior to diffusion bonding.
Figure 4B:
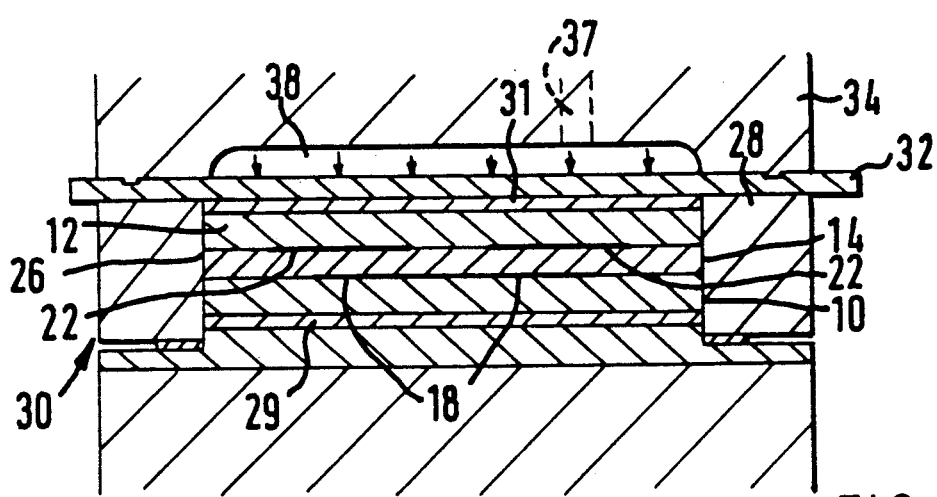

After deposition of yttria in areas 18 and 22, sheets 10, 12, 14 are formed together into a stack or pack with third sheet 14 being sandwiched between the first and second sheets 10 and 12 (see FIGS. 4a and 4b—in FIG. 4a the areas 18, 20 and 22 are shown in broken lines); the stack is loaded into a cavity 26 in the base 28 of a diffusion bonding press 30 and placed on top of a spacer 29; a further spacer 31 and a membrane 32 are placed over the stack and the press is sealed by clamping a top 34 against the base 28 thereby compressing the edges of the membrane 32 and sealing the cavity 26 (in FIG. 4a the top 34, the membrane 32 and the spacer 31 have been omitted). The press is heated to 560° C. and during this heating step, the cavity 26 is evacuated for 10 minutes to achieve a vacuum of $10^{-6}$ mbar or better. This evacuation is carried out via a vacuum pipe 36 passing through the wall of the base 28 and connected to a pump (not shown).

After the stack has reached the required temperature, a bonding pressure of 1000 psi (7 MPa) is applied to the stack by supplying pressurised gas through an inlet 37 to a space 38 above the diaphragm 32. The bonding pressure and temperature are maintained for as long as is necessary to achieve diffusion bonding between the areas of sheets 10, 12 and 14 not covered by the yttria deposits; typically this takes about 3 hours. After diffusion bonding has taken place, the stack is removed from the press and allowed to cool.

Figure 5:
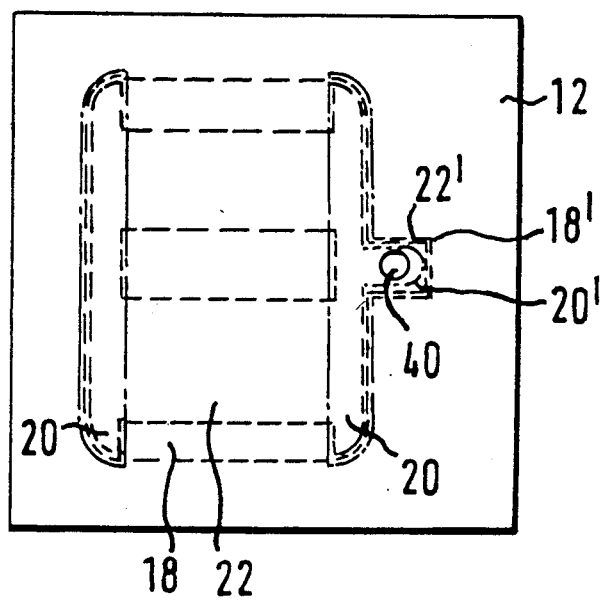
FIG. 5 is a plan view of the stack of sheets after diffusion bonding but prior to superplastic forming.
Figure 6A:
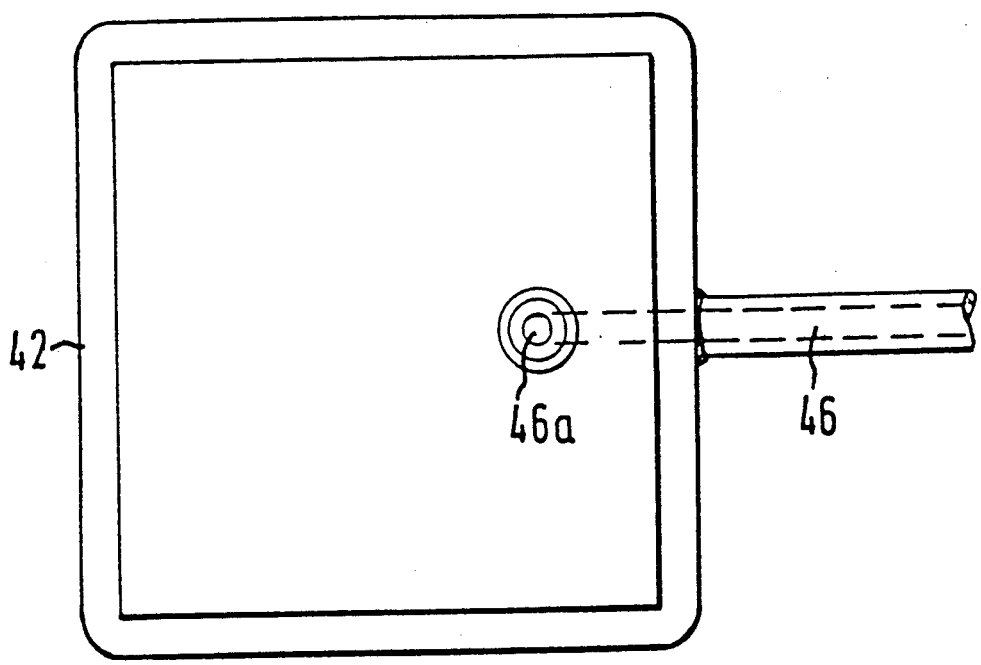
FIG. 6a shows an underneath view of superplastic forming apparatus.
Figure 6B:
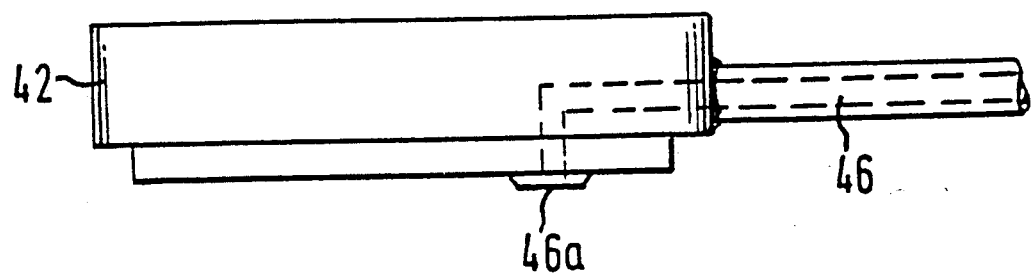
Figure 6C:
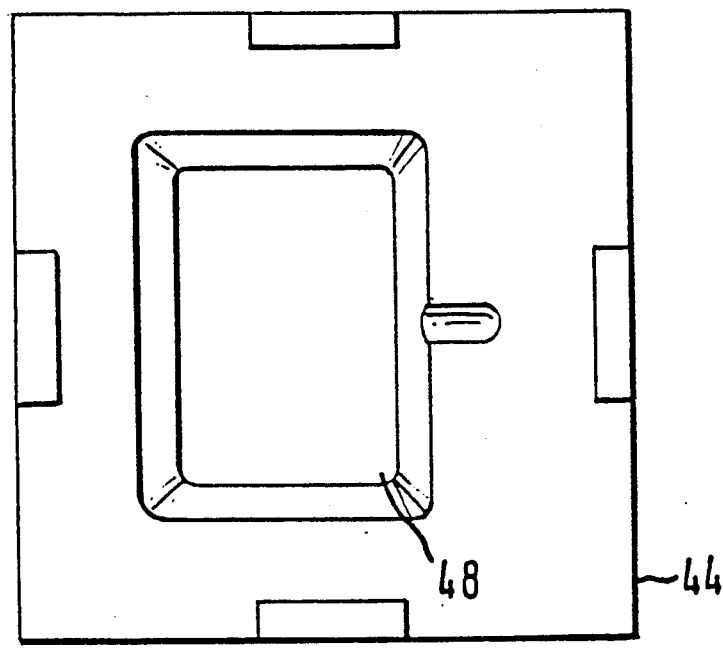
Figure 6D:
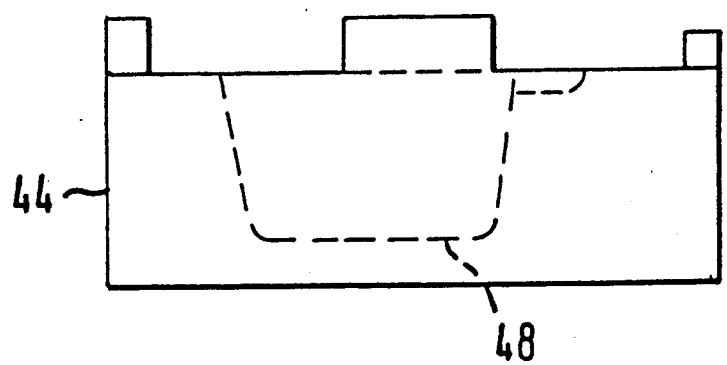
FIG 6d shows a side view of the base of the same superplastic forming apparatus.

After cooling, a gas-supply hole 40 (see FIG. 5) is drilled in the stack of bonded sheets (the shapes of the areas 18, 20 and 22 are shown by broken lines in FIG. 5); the hole 40 passes through the tail 20' in the cut-out section 20 of the third sheet 14 and through the tail parts 18' and 22' in the stop-off areas 18, 22 to allow gas to be injected into the interior of the stack, as described in more detail below; the hole 40 does not, however, extend all the way through the stack of sheets and does not pass through the first (lower) sheet 10. The stack is then loaded into the superplastic forming (SPF) tooling shown in FIGS. 6a and b. The SPF tooling includes an upper tool part 42, shown in FIG. 6a, and a lower tool part 44 shown in FIG. 6b. The upper tool part 42 is provided with a supply line 46 for the supply of an inert gas, such as argon or compressed air, to the diffusion bonded stack during the SPF step; the outlet 46a of the gas supply line 46 is located in register with the above-described gas-supply hole 40 that has been drilled in the stack. The lower tool part 44 is formed with an internal surface 48 corresponding to the outer surface of the structure to be formed.

After the bonded stack has been loaded into the SPF tool, the tool is placed in a preheated press (530° C.) and the temperature allowed to stabilise (which takes approximately 20 minutes). Compressed air is then injected into the interior of the stack via supply line 46 and the gas-supply hole 40 drilled in the stack, the gas pressure being controlled to produce an optimum pressure-time cycle which may be calculated in advance using computer modelling techniques.

Figure 7:
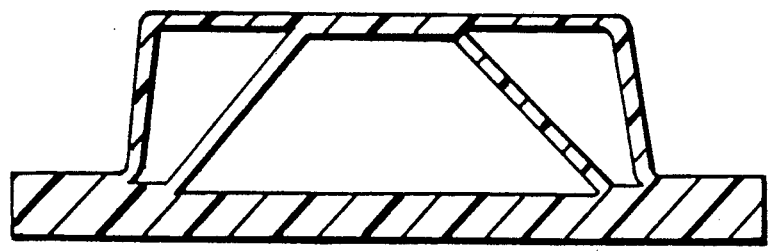
FIG. 7 is a sectional view of a component made from the stack of sheets after superplastic forming.

The porous nature of the stopping-off deposit allows the gas under pressure to permeate from the gas-supply hole 40 to the interface between the sheets of the stack where the sheets are not bonded (i.e. in areas 18, 20 and 22), and the gas pressure, in conjunction with the high temperature, causes the stack to inflate superplastically into the recess 48 formed in the lower tool 44 until the final structure is obtained, which is then allowed to cool. FIG. 7 shows in section the structure obtained from the first, second and third sheets of FIGS. 1 to 3.

The diffusion bonding is performed within 20 minutes of the cleaning of the aluminum sheets to prevent oxide re-forming that would block such diffusion bonding. Alternatively, it is possible to weld the edges of the stack of sheets 10, 12 and 14 shown in FIG. 4 within that time by electron beam welding and then diffusion bonding can be performed at leisure not only in the apparatus of the type shown in FIGS. 4a and 4b but alteratively in a hot isostatic press.

By depositing the stop-off material in areas 18, 20 and 22 using plasma spraying, no volatile carriers are required that could block the diffusion bonding in other areas of the aluminum sheets. We have found that plasma spraying can achieve successful stopping-off of accurately defined areas.

We claim:

1. A method of diffusion bonding components together, which method comprises:
   (a) plasma spraying a stopping-off material on at least one selected area of a first surface of a first component;
   (b) juxtaposing the said first component with at least a second component to form a stack in which the said first surface of the said first component lies adjacent to the second component, and
   (c) heating and pressing together the components in the stack to form a diffusion bond between the first component and the second component, the stopping-off material preventing such bonding in the said at least one selected area.

2. A method as claimed in claim 1, wherein the stopping-off material is a ceramic material.

3. A method as claimed in claim 1, wherein the stopping-off material is selected from the group consisting of yttria, alumina, magnesia, boron nitride and rare earth oxides.

4. A method as claimed in claim 1, wherein the stopping-off material is plasma sprayed through a mask.

5. A method as claimed in claim 1, wherein the components are made of materials selected from the group consisting of aluminum and aluminum alloys.

6. A method as claimed in claim 5, which further comprises removing aluminum oxide from the components prior to the application of the stopping-off material and wherein the stopping-off material is applied within 20 minutes after oxide removal.

7. A method as claimed in claim 1, wherein the materials used in plasma spraying are substantially free of oil.

8. A method as claimed in claim 1, wherein the deposited stopping-off material is porous.

9. A method as claimed in claim 1, wherein at least three components are juxtaposed to form the said stack, each component having at least one surface that lies adjacent to a surface of one other component, and wherein at least one of the said adjacent surfaces has a stopping-off material applied to at least one selected area thereof by plasma spraying to prevent diffusion bonding in the said at least one selected area.

10. A method as claimed in claim 1, which additionally comprises superplastically forming the diffusion bonded components to a desired shape.

11. A method of superplastically forming a stack of at least two components, which method comprises:
    (a) plasma spraying a stopping-off material on at least one selected area of a first surface of a first component;
    (b) juxtaposing the said first component with at least a second component to form a stack in which the said first surface of the first component lies adjacent to the second component;
    (c) heating and pressing together the components in the stack to form a diffusion bond between the first component and the second component, the stopping-off material preventing such bonding in the said at least one selected area, and
    (d) supplying gas to the said at least one selected area to inflate the stack and superplastically form the diffusion bonded components to a desired shape.

12. A method as claimed in claim 11, wherein the stopping-off material is a ceramic material.

13. A method as claimed in claim 11, wherein the stopping-off material is selected from the group consisting of yttria, alumina, magnesia, boron nitride and rare earth oxides.

14. A method as claimed in claim 11, wherein the stopping-off material is plasma sprayed through a mask.

15. A method as claimed in claim 11, wherein the components are made of materials selected from the group consisting of aluminum and aluminum alloys.

16. A method as claimed in claim 15, which further comprises removing aluminum oxide from the components prior to the application of the stopping-off material and wherein the stopping-off material is applied within 20 minutes after oxide removal.

17. A method as claimed in claim 11, wherein the materials used in plasma spraying are substantially free of oil.

18. A method as claimed in claim 11, wherein the deposited stopping-off material is porous.

19. A method as claimed in claim 11, wherein at least three components are juxtaposed to form the said stack, each component having at least one surface that lies adjacent to a surface of one other component, and wherein at least one of the said adjacent surfaces has a stopping-off material applied to at least one selected area thereof by plasma spraying to prevent diffusion bonding in the said selected area.

* * * * *